3,344,817
METHOD OF SELECTIVELY HARDENING A COR-
ROSION RESISTANT PART AND THE ARTICLE
PRODUCED THEREBY
John M. Connard, Elgin, Ill., assignor to Illinois Tool
Works Inc., Chicago, Ill., a corporation of Delaware
Filed May 28, 1965, Ser. No. 459,826
5 Claims. (Cl. 148—12.1)

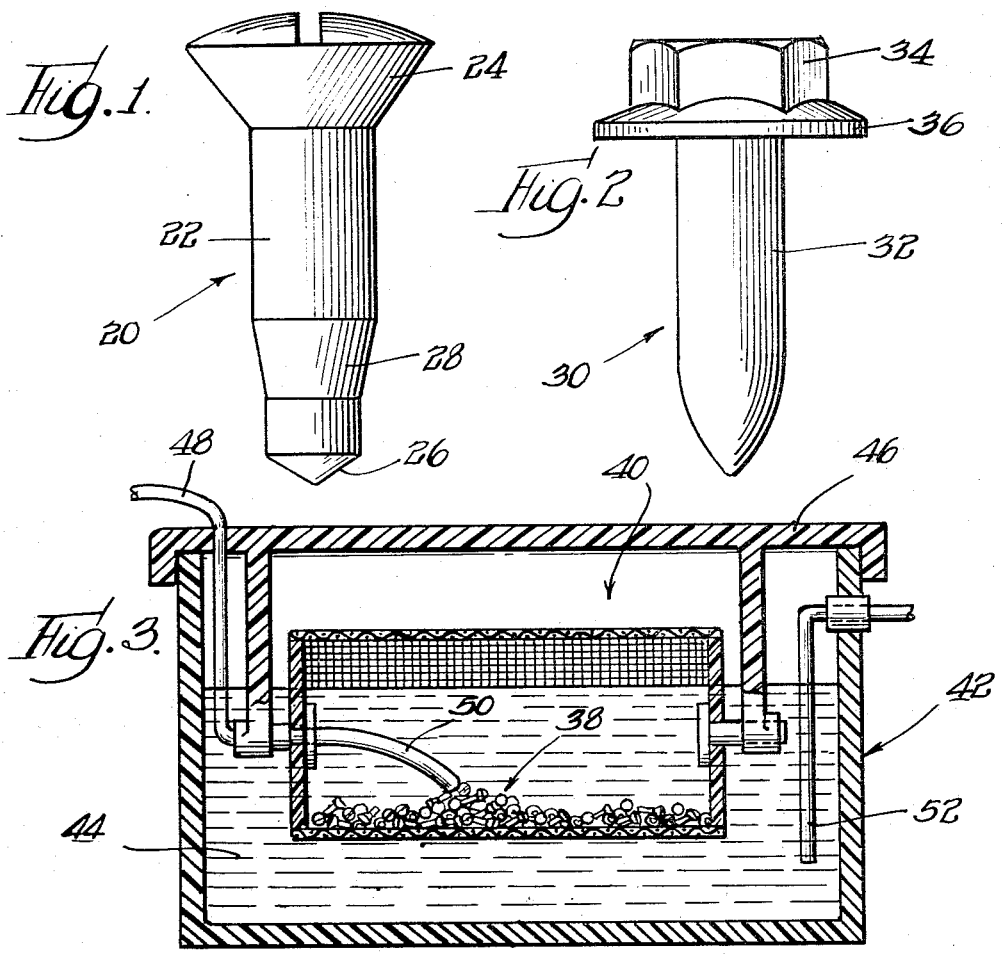
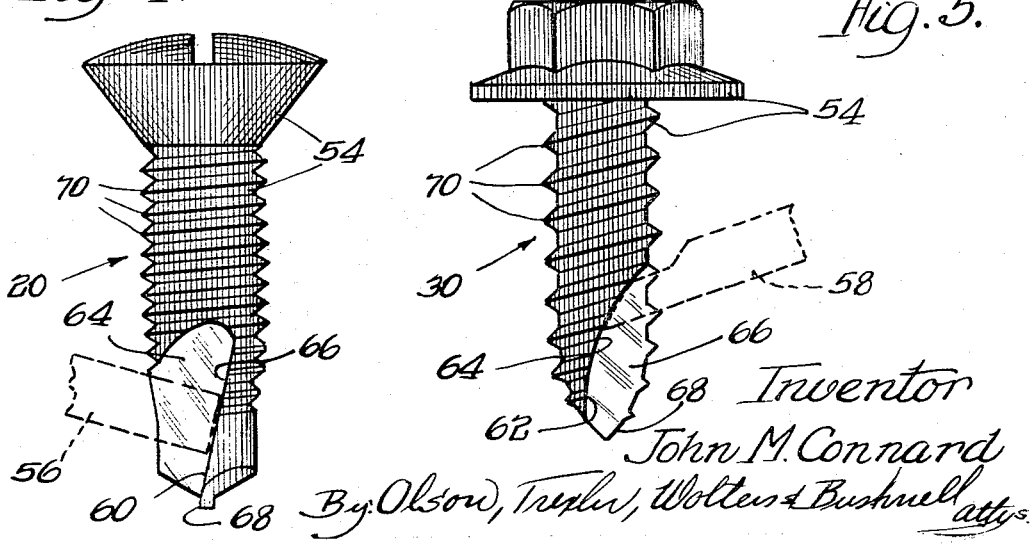

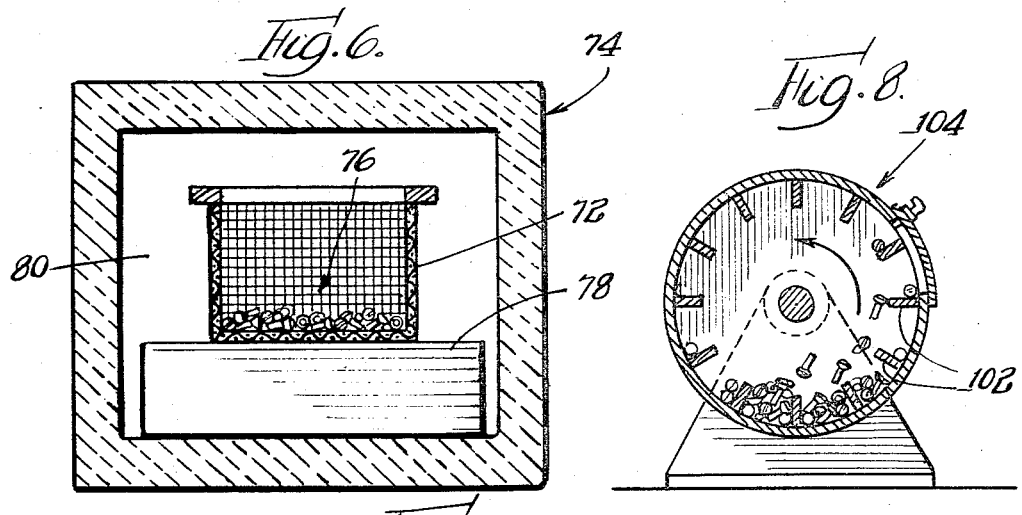
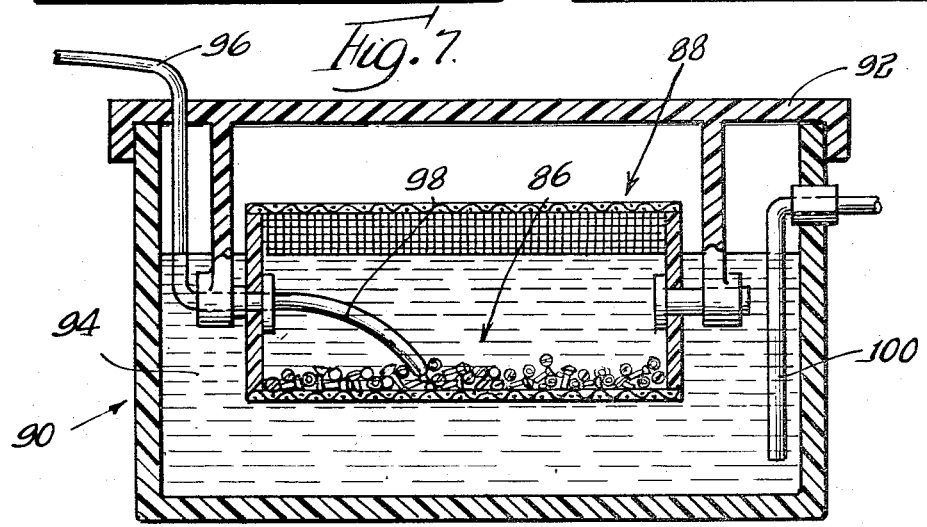
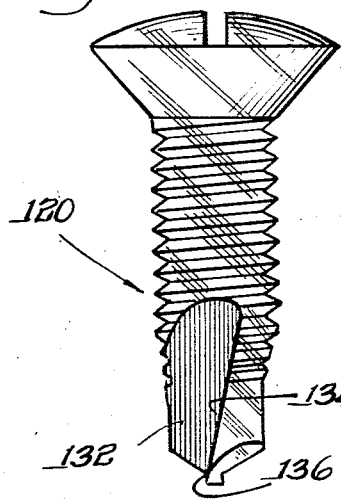
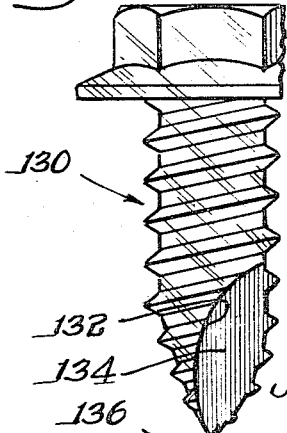
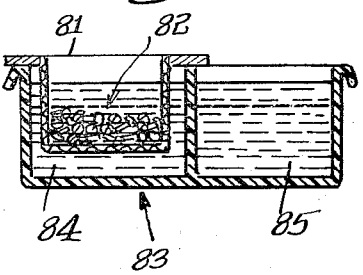

ABSTRACT OF THE DISCLOSURE

A method of providing chromium and nickel-chromium steel screws with hardened drilling and cutting surfaces without sacrificing the toughness, bright finish and corrosion resistance of the screw body. A threaded screw body is electroplated with a gas impervious metallic layer and then subjected to a metal-forming operation to remove coated and base material at the region to be hardened. The processed screw body is then contacted with a reactable gas, and the protective metallic layer is stripped off.

---

This invention relates generally to the art of metallurgy and more particularly to that aspect of the metallurgic art which involves treating metal parts so as to increase their surface hardness and wear resistance.

In one specific aspect, the present invention relates to a corrosion resistant screw having drilling and thread cutting capabilities and to a method of making such an article.

Chromium steels and nickel-chromium steels are known to have good resistance to corrosion, but these alloys cannot be readily provided with a hardened case that exhibits the same properties. In the past, therefore, it has not been possible to produce with any facility tough, bright finished parts, such as screws, having the ability to cut readily into such metals as ordinary carbon steel for example.

Accordingly, an improtant object of the present invention is to provide a novel method of selectively hardening a corrosion resistant part.

Another object of the invention is to provide such a method that is easy and economical to practice.

Still another object of the invention is to provide a method of selectively hardening a corrosion resistant part while preserving the original toughness thereof.

A further object of the invention is to provide a selectively hardened, corrosion resistant part.

A still further object of the invention is to provide such a part that is easily and economically produced.

These and other objects and features of the invention will become more apparent from a consideration of the following descriptions.

In order that the principles of the invention may be readily understood, a single embodiment thereof, applied to the manufacture of threaded fasteners but to which the application is not to be restricted, is shown in the accompanying drawings wherein:

FIGS. 1 and 2 are enlarged elevational views of screw blanks made of corrosion-resistant metal and intended for selective hardening in compliance with the invention;

FIG. 3 is a schematic view showing plating apparatus for the electrolytic application of a gas impervious metallic coating to parts blanks, specifically the screw blanks of FIGS. 1 and 2;

FIGS. 4 and 5 are elevational showings of the parts blanks of FIGS. 1 and 2 respectively after they have been coated in compliance with the procedure of FIG. 3 and after they have been exposed to a metal removal operation in processing the parts toward their ultimate shape, cutting tools for achieving the metal removal being suggested in broken outline in FIGS. 4 and 5;

FIG. 6 is a schematic view of a heat-treating furnace in which parts blanks such as those shown in FIGS. 4 and 5 are displayed to a reactable gas at an elevated temperature in order to form a hardened case at selective areas;

FIG. 7 is a schematic view showing the electrolytic removal of the gas impervious metallic coating applied in the procedure illustrated in FIG. 3;

FIG. 7a is a schematic view of an alternate scheme for removal of the gas impervious coating;

FIG. 8 is a schematic view showing a finishing procedure for the parts which may be employed after removal of the gas impervious coating; and FIGS. 9 and 10 show the parts blanks of FIGS. 1 and 2 as finished products produced in compliance with the principles of the invention.

In compliance with the procedural features of the invention, either crude blanks or semi-processed parts are first fabricated of a corrosion-resistant ferrous alloy. These workpieces are then provided with a substantially gas impervious coating that is advantageously developed by electroplating the workpieces with a layer of metallic copper. The coated workpieces are next subjected to a metal removing operation to process the parts toward their ultimate shape and simultaneously remove portions of the gas impervious coating selectively exposing the ferrous alloy at locations where a hardened case is desired. The workpieces are thereafter displayed to a reactable gas at an elevated temperature to permit the gas to react chemically with the ferrous alloy so as to produce a new and harder substance at the selectively exposed locations. Finally, the remaining gas impervious layer is removed to reveal the unreacted regions of the ferrous alloy part. Thus, a part is produced which possesses a selectively hardened area or region which is capable of resisting wear and cutting or drilling into softer metal, the remainder of the finished part being preserved in its original toughness and corrosion-resistant character.

More specifically and with reference to the drawings, particularly FIG. 1, a semi-processed screw blank is indicated there generally by the reference numeral 20. The screw blank 20 is fabricated from a corrosion-resistant ferrous alloy such as for example the various chromium and nickel-chromium steels commonly referred to as stainless steels. Structurally, the screw blank 20 comprises a shank 22, a sotted head 24, a chisel-pointed entering end 26, and a frusto-conical intermediate section 28. Similarly, a screw blank indicated generally by the reference numeral 30 in FIG. 2 is fabricated from a corrosion-resistant ferrous alloy and comprises a projectile-shaped shank 32, a head 34 which is formed to hexagonal shape in order to present a tool-engageable formation, and a generally annular flange 36 which is disposed intermediate the shank 32 and the head 34. While the screw blanks 20 and 30 are specifically shown to be free of thread, it is within the purview of the instant invention to roll threads on the appropriate portions of these blanks prior to further treatment in compliance with the invention.

Before application of the gas impervious coating, the parts blanks or workpieces are made metallurgically clean; and frequently, vapor or ultrasonic degreasing is sufficient to produce the desired degree of cleanliness. Actual application of the gas impervious coating is illustrated schematically in FIG. 3 where a batch 38 of parts blanks or workpieces is confined in a barrel apparatus 40. The barrel apparatus 40 is immersed in a tank 42 containing a suitable electrolytic solution 44. The barrel apparatus 40 is suspended in tank 42 by means of a hanger 46 to be rotated about its longitudinal axis by drive means, not shown. Electrical potential is applied to the batch of workpieces from a cable 48 by means of a dangler lead 50, a cooperating electrode 52 being submerged in the solution 44. In compliance with conventional practice, the barrel apparatus 40 is suitably perforated to admit the solution 44 into contact with the batch of workpieces; and in accordance with the invention, the barrel apparatus 40 is so operated in conjunction with the tank 42 and its associated equipment as to produce a layer of metallic copper on each of the workpieces in the batch 38. A layer of copper 0.0002–0.0008 inch thick is applied and has proved to prevent the penetration of the reactable gas during the selective hardening step. While metallic nickel is too porous alone to serve as the coating, it is possible and sometimes desirable to provide the workpieces with a pre-coat or underlayment of metallic nickel which is then overcoated with a top layer of metallic copper. Whether copper is used alone or with an undercoat of this character, the protective layer is applied in sufficient density and thickness to prevent any substantial penetration of the reactable gas. Such metals as zinc and cadmium could be used to form the protective layer, but it has been found that these two metals vaporize at the temperatures encountered during the display of the parts to the reactable gas, thus defeating their protective potential. In addition, it has been found that metallic chromium, like metallic nickel, is too porous for adequate protection when used alone.

After coating, the screw blanks 20 and 30 are covered with a layer 54 of metallic copper as is shown in FIGS. 4 and 5. In compliance with an important feature of the present invention, this covering layer is mechanically stripped from selected areas or regions where a hardened case is desired on the ultimate part. Advantageously, the selective divestment of layer 54 is caused to take place simultaneously with a processing of the workpieces toward their ultimate shape; and in the case of screw blanks 20 and 30, particularly when screws having drilling or thread cutting capabilities are to be manufactured, a metal removing operation may be employed in achieving these dual objectives. Specifically, a cutting tool, such as the milling cutters 56 and 58 illustrated in FIGS. 4 and 5 respectively, are employed in cutting abbreviated, generally axially extending grooves or slots 60 and 62 in the screw banks 20 and 30. The slots 60 and 62 may take an angular extent of approximately 90 degrees with respect to the longitudinal axis of the screw blank and may vary in their exact shape and position. However, the formation of these slots generates faces 64 and 66 which are free of the gas impervious layer 54. Thus, the faces 64 and 66 expose the ferrous alloy from which the screw blanks 20 and 30 were originally fabricated. The described cutting operation also advantageously forms a drill point surface 68 on the screw blank, and such a drill point surface may be provided by pinching or squeezing of the metal as well as by cutting. Furthermore, in the case where the screw blanks have not been preliminarily formed with threads, threads 70 may be rolled into the material of these screw blanks after the blanks have been provided with the electroplated layer 54.

After the coated workpieces have been processed to expose the corrosion resistant ferrous alloy selectively at locations where a hardened case is desired, the workpieces are collected in foraminous baskets 72, as is shown in FIG. 6, to be inserted in a heat treating furnace 74. In that figure, a batch of such workpieces is indicated generally at 76, and the basket 72 is disposed on a refractory hearth 78. The furnace 74 is filled with a gas 80 that is reactable with the ferrous alloy of the workpieces to produce a new and harder substance at the selectively exposed regions thereof, particularly through the formation of carbides, nitrides or a combination of such substances. The gas 80 therefore advantageously comprises a nitrogen-bearing gas such as ammonia, a carbon-bearing gas such as propane, or a combination of such gases. In addition, an inert carrier gas is usefully included as a component of the gas 80. This carrier gas may comprise substantially pure nitrogen or a mixture of nitrogen, carbon monoxide, water vapor, hydrogen and methane; and the carbon-bearing gas may be, in addition to propane, purified natural gas, which is known to consist chiefly of paraffinic hydrocarbons containing from one to five carbon atoms. The carbon-bearing gas may also be a component of natural gas other than propane, such as for example methane or butane. One particularly advantageous mixture of nitrogen-bearing gas, carbon-bearing gas and carrier gas comprises anhydrous ammonia in a proportion of from about three to about fifty percent by volume of the total, purified natural gas in an amount of from about zero to about ten percent by volume of the total, and carrier gas comprising the remainder or balance of the total volume.

The workpieces are displayed to the reactable gas at an elevated temperature in order to promote combination of the reactable ingredients of the gas with the exposed regions of the ferrous alloy. Useful temperatures in this regard range from about 1450° F. to about 1650° F.; and when such temperatures are employed, a residence of about one and one-half hours in the furnace 74 produces a case on the exposed locations of the workpieces. This case suitably hardens when the parts are rapidly cooled, i.e. quenched, by immersion in either oil or water. Specifically, such a residence in the furnace has been found to produce a case approximately 0.004 inch in thickness. The furnace 74 is heated in any suitable manner. Continuous furnaces and furnaces of the reciprocating hearth (shaker) type may also be used if desired.

It is known that the chromium constituent of the alloy workpieces readily combines with carbon to form insoluble carbides, and it is theorized that the aforementioned furnace treatment and quenching forms a martinsitic case with carbides and nitrides dispersed in the martinsitic matrix.

After the workpieces have been removed from the heat treating furnace, the gas impervious layer is removed. Because the gas impervious layer in the disclosed embodiment is specifically metallic copper, this material is easily, quickly and economically removed by a stripping procedure. Stripping may be by either electrolytic or chemical methods, although chemical stripping is simpler and less expensive.

With reference to FIG. 7a, a batch 82 of the heat treated workpieces is collected in a foraminous basket 82 for immersion in chemical stripping baths contained in a dual-compartment tank 83. The batch 82 of workpieces is immersed in a first solution 84 contained in one of the compartments of the tank 83, and the solution 84 is desirably a water solution of sodium sulfide. A second solution 85 is contained in the other compartment of tank 83, and the solution 85 usefully comprises a water solution of sodium cyanide. By suitably cycling the batch of workpieces between the two solutions 84 and 85, the gas impervious layer is easily removed.

With reference to FIG. 7, a batch 86 of the heat treated workpieces is collected in a barrel apparatus 88 which is suspended in a plating tank 90 by means of a hanger assembly 92. The tank 90 is filled with a suitable, electrolytic solution 94, and the workpieces in batch 86 are made to comprise one electrode by means of a cable 96 which forms electrical connection with a dangler lead 98, dangler lead 98 depending flexibly into contact with the individual parts in the batch 86. The cooperating electrode is provided by means of an immersed, conductive element 100, and suitable agitation of the workpieces is achieved by rotating the barrel apparatus 88 through a drive means, not shown. As will be recognized, the workpieces are arranged in the stripping operation to be opposite in polarity to their arrangement in the plating operation.

Upon completion of the stripping of the workpieces, they are washed and dried and subjected to any desired finishing operation. For example and with reference to FIG. 8, selectively hardened and stripped workpieces 102 may be mixed with a suitable burnishing medium, such as ground corn cobs, and tumbled in a drum device 104 to burnish the surfaces of the parts. If any post-finish plating is desired, it is performed at this general stage in the process, i.e. after stripping of the gas impervious layer.

Finished parts produced from the screw blanks 20 and 30 are illustrated in FIGS. 9 and 10. These finished parts are illustrated respectively at the reference numerals 120 and 130. The finished screws 120 and 130 have case hardened surfaces 132 and 134 which correspond to the exposed surfaces 64 and 66 respectively. In addition, the finished screws have hardened portions 136 at their tip corresponding to the selectively exposed drill point surfaces 68. The surfaces 132 and 134 and the tip 136 include substantial amounts of metal nitrides or carbides or both; and these substances, while relatively hard and capable of cutting into softer materials, are not particularly resistant to corrosion. However, the remainder of the finished screws 120 and 130 retain the corrosion resistant character of the material from which they were originally fabricated; and not only do they retain this corrosion resistance but also the other chemical and physical properties of the original material, such as for example toughness. The screws 120 and 130 have drilling and thread cutting capabilities and may be easily turned into such sheet metals as ordinary carbon steel without preliminary drilling, punching or tapping. Because of these capabilities and because of the general corrosion resistance of the bulk of the body of these screws, they may be used to advantage in equipment where humidity and corrosion are matters of concern, such as for example laundry equipment, dishwashers, garbage disposal units and analogous apparatus.

From the foregoing descriptions, it will be recognized that the present invention offers a method of selectively hardening a corrosion resistant part in an easy and economical manner, preserving at the same time the original toughness and corrosion resistance of the part. These advantages are achieved by employing metal working and treating procedures in a novel sequence whereby to achieve objectives not ordinarily achieved by the individual process steps. Therefore, the specific examples herein shown and described are to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:
1. A method of selectively hardening a corrosion resistant drilling and thread cutting screw comprising the steps of: providing a threaded screw body of a corrosion resistant ferrous alloy selected from the group consisting of Cr and Cr–Ni steels; electroplating said screw body to coat is uniformly with a substantially gas impervious metallic layer; subjecting the coated screw body to a metal forming operation to remove a portion of the tip portion as well as an axially extending portion of the threaded shank along with said layer to selectively expose the ferrous alloy at the tip as well as said shank portion where a hardened case is desired; contacting said processed screw body with an atmosphere comprising a reactable gas selected from the group consisting of a nitrogen bearing gas, a carbon bearing gas and mixtures thereof at an elevated temperature, said gas being reactable with the ferrous alloy to produce a new and harder substance at the tip and along said shank at their exposed location; and removing the gas impervious layer from said part to reveal the unreacted regions of the ferrous alloy.
2. The method according to claim 1 wherein said reactable gas includes ammonia.
3. The method according to claim 1 wherein said reactable gas includes a short chain, paraffin series hydrocarbon.
4. The method according to claim 1 wherein said reactable gas includes ammonia; a short chain, paraffin series hydrocarbon; and a substantially inert carrier gas.
5. The method according to claim 1 wherein said elevated temperature is from about 1450° F. to about 1650° F.

References Cited
UNITED STATES PATENTS 2,368,007   1/1945   Delahan et al. _____ 148—12.1
2,397,585   4/1946   Anderson _____ 148—12.1

FOREIGN PATENTS 597,022   1/1948   Great Britain.
22,122   10/1963   Japan.

OTHER REFERENCES

Metals Handbook: 1948 edition, relied on pages 693 and 694.
Metals Handbook: 1964, 8th edition, vol. 2, relied on pages 110 and 111.

CHARLES N. LOVELL, *Primary Examiner.*